No. 765,021.

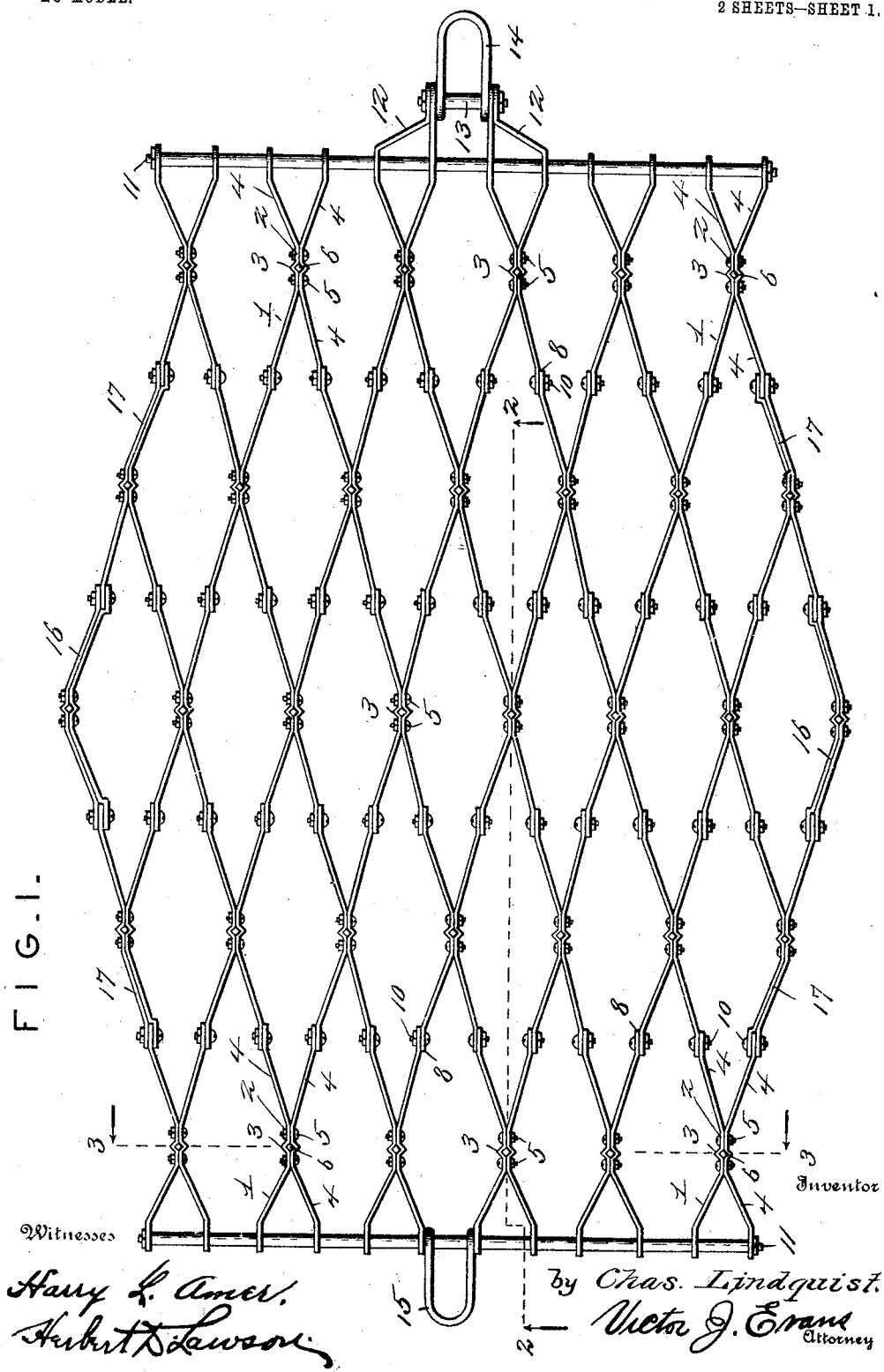

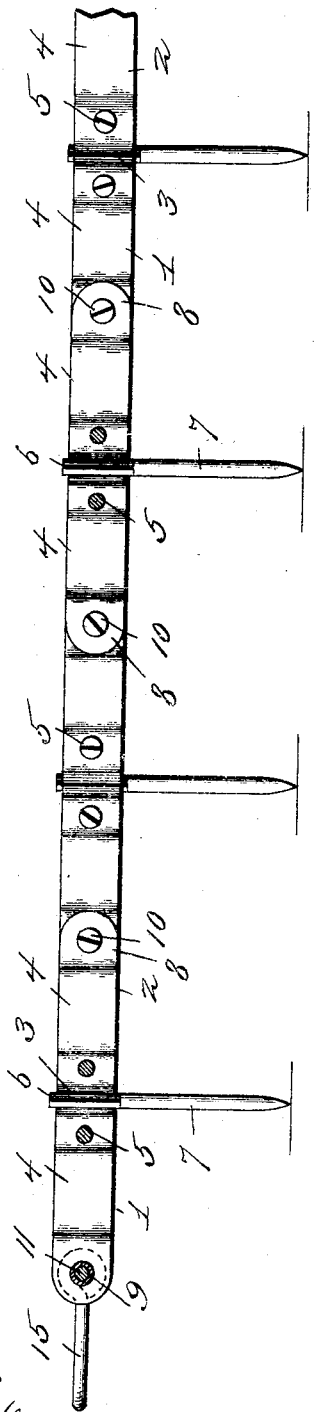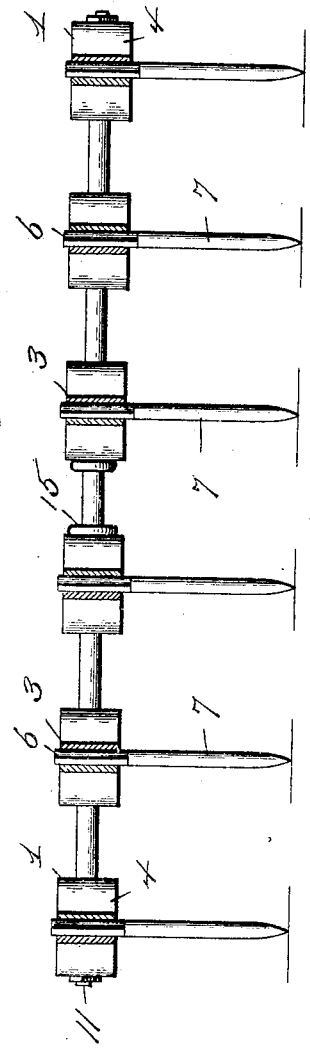

Patented July 12, 1904.

UNITED STATES PATENT OFFICE.

CHARLES LINDQUIST, OF DEERLODGE, MONTANA.

HARROW.

SPECIFICATION forming part of Letters Patent No. 765,021, dated July 12, 1904.

Application filed October 17, 1903. Serial No. 177,457. (No model.)

*To all whom it may concern:*

Be it known that I, CHARLES LINDQUIST, a citizen of the United States, residing at Deerlodge, in the county of Powell and State of Montana, have invented new and useful Improvements in Harrows, of which the following is a specification.

My invention relates to new and useful improvements in harrows; and its object is to provide a simple device of this character formed of sections which are pivoted together in such a manner as to permit them to be readily removed and replaced and which also allows the harrow to readily pass over uneven surfaces without removing the teeth from contact with the ground.

A further object of the invention is to provide simple means for securing the teeth of the harrow in position.

With the above and other objects in view the invention consists in the novel construction and combination of parts hereinafter more fully described and claimed, and illustrated in the accompanying drawings, showing the preferred form of my invention, and in which—

Figure 1 is a plan view of the harrow. Fig. 2 is a section on line 2 2, Fig. 1; and Fig. 3 is a section on line 3 3, Fig. 1.

By referring to the drawings it will be seen that the harrow is formed of a multiplicity of sections each of which is formed of two angular metallic strips 1, having an intermediate portion 2, provided with an angular recess 3 and laterally-extending arms 4, which project from the ends of the intermediate portion at angles thereto. The two strips of each section are adapted to be secured together by means of bolts 5, with the angular recesses 3 registering, and these recesses serve to receive the head 6 of a harrow-tooth 7, said head being preferably angular in cross-section, so as to fit snugly within the recesses 3. It will be seen that each section is substantially X-shaped, and the ends 8 of the arms 4 thereof are parallel and are provided with apertures 9 for the reception of bolts 10, whereby two or more of the sections can be fastened together. The sections are preferably arranged in series, those of the first series being connected at their front ends by means of a rod 11, which extends through the apertures 9. The second series of sections is bolted to the rear ends of the first series, said sections being arranged in rear of the spaces formed between the sections of the first series, and the succeeding sections are secured in position in the same manner, any desired number of series being employed. The rear ends of the rear section are connected by means of a rod 11, such as described in relation to the front series of sections of the harrow. The two central sections of the front series are provided with extensions 12, which form brackets and are connected by means of a pin 13, on which is pivoted a loop 14. A loop 15 is also preferably pivoted upon the center of the rear rod.

It will be seen that when this harrow is drawn over uneven surfaces the various series thereof will swing upon their connecting-bolts 10, thereby preventing any of the teeth from being removed from the ground and permitting the entire harrow to accommodate itself to the surface over which it is drawn. Should it be desired to remove one of the teeth for the purpose of repairing or replacing it, it is merely necessary to remove the bolts 5 at opposite sides thereof, so as to permit the strips of its section to be sprung apart. The new tooth can then be placed in position and securely held by clamping the intermediate portions 2 of its section upon opposite sides thereof.

Where desirable and in order to prevent the ends of the side sections of the harrow from projecting outward, a half-section 16 may be employed, as shown in Fig. 1, this section being formed of two strips bolted together at their ends and intermediate portions. Other projecting ends can also, if desired, be bent inward and secured by the bolts 10 instead of providing the especially-constructed strip 16. I have shown some of these ends bent in this manner at 17 in Fig. 1.

It will of course be understood that any desired number of series may be employed in the formation of the harrow, and two or more of these harrows may be fastened together to increase the working area thereof.

The device is extremely simple and inexpensive in construction and when not in use can, if desired, be folded, so as to occupy the minimum amount of space.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. A harrow comprising parallel series of sections hinged together, the sections of the series being alternately arranged and comprising oppositely-arranged similar strips having recessed intermediate portions, teeth between the intermediate portions, means for clamping said portions upon the teeth, bracket extensions upon one of the series, and a link pivotally connected to the extensions.

2. A harrow comprising parallel series of sections hinged together, the sections of the series being alternately arranged and comprising oppositely-arranged similar strips having recessed intermediate portions, teeth between the intermediate portions, means for clamping said portions upon the teeth, and a cross-rod connecting the outer ends of each end series of sections.

3. A harrow comprising parallel series of sections hinged together, the sections of the series being alternately arranged and comprising oppositely-arranged similar strips having recessed intermediate portions, teeth between the intermediate portions, means for clamping said portions upon the teeth, a cross-rod connecting the outer ends of each end series of sections, bracket extensions upon one of the series projecting beyond the adjoining cross-rod, and a link pivotally connected to said extensions.

In testimony whereof I affix my signature in presence of two witnesses.

CHARLES LINDQUIST.

Witnesses:
H. A. McPHERSON,
C. S. SCHROEDER.